(12) United States Patent
Banerjee et al.

(10) Patent No.: US 12,541,216 B2
(45) Date of Patent: Feb. 3, 2026

(54) CONTROLLER AREA NETWORK (CAN) TRANSCEIVER

(71) Applicant: TEXAS INSTRUMENTS INCORPORATED, Dallas, TX (US)

(72) Inventors: Deep Banerjee, Bengaluru (IN); Lokesh Kumar Gupta, Bengaluru (IN); Abhijeeth Aarey Premanath, Allen, TX (US); Richard Sterling Broughton, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 332 days.

(21) Appl. No.: 16/459,107

(22) Filed: Jul. 1, 2019

(65) Prior Publication Data

US 2020/0264643 A1   Aug. 20, 2020

(30) Foreign Application Priority Data

Feb. 20, 2019   (IN) .............................. 201941006687

(51) Int. Cl.
*G05F 1/56* (2006.01)
*H04B 1/40* (2015.01)
*H04L 12/40* (2006.01)

(52) U.S. Cl.
CPC ................ *G05F 1/56* (2013.01); *H04B 1/40* (2013.01); *H04L 12/40013* (2013.01)

(58) Field of Classification Search
CPC ..... H04L 12/40013; H04L 2012/40215; G06F 13/20
See application file for complete search history.

(56) References Cited

U.S. PATENT DOCUMENTS

| 7,224,188 | B2 * | 5/2007 | Visser | ............... | H04L 25/03878 326/26 |
| 10,784,858 | B2 * | 9/2020 | Lecce | ................... | H03K 17/102 |
| 2015/0116029 | A1 * | 4/2015 | Litty | .................... | H03K 17/687 257/339 |
| 2016/0204770 | A1 * | 7/2016 | Lee | ..................... | H03K 19/0013 327/333 |

OTHER PUBLICATIONS

Vishay Electro-Films, "Thin Film, Center-Tapped Resistor Divider Network", Document No. 61030, Mar. 20, 2013, p. 1 (Year: 2013).*
Texas Instruments. "TCAN1042-Q1 Automotive Fault Protected CAN Transceiver with CAN FD." Data Sheet. SLLSES9C—Feb. 2016—Revised Mar. 2019, 43 pages.

* cited by examiner

*Primary Examiner* — Menatoallah Youssef
*Assistant Examiner* — Colleen J O Toole
(74) *Attorney, Agent, or Firm* — Xianghui Huang; Frank D. Cimino

(57) ABSTRACT

A bus transceiver circuit including a current source device, a current mirror coupled to the current source device, and a first transistor having a first control input and first and second current terminals. The bus transceiver circuit also includes a second transistor having a second control input and third and fourth current terminals. The third current terminal is coupled to the first control input at a first node. The fourth current terminal is coupled to the current mirror. A resistor is coupled between the first current terminal and the first node.

20 Claims, 3 Drawing Sheets

CONTROLLER AREA NETWORK (CAN) TRANSCEIVER

CROSS-REFERENCE TO RELATED APPLICATIONS

This application claims priority to Indian Provisional Application No. 201941006687, filed Feb. 20, 2019, which is hereby incorporated by reference.

BACKGROUND

The controller area network (CAN) is a bus standard designed to allow microcontrollers and devices to communicate with one another in applications without a host computer. The CAN BUS protocol is a message-based protocol, particularly suitable for multiplexed electrical wiring within automobiles to save copper, but is also used in other contexts.

SUMMARY

In accordance with an example, a bus transceiver circuit including a current source device, a current mirror coupled to the current source device, and a first transistor having a first control input and first and second current terminals. The bus transceiver circuit also includes a second transistor having a second control input and third and fourth current terminals. The third current terminal is coupled to the first control input at a first node. The fourth current terminal is coupled to the current mirror. A resistor is coupled between the first current terminal and the first node.

BRIEF DESCRIPTION OF THE DRAWINGS

For a detailed description of various examples, reference will now be made to the accompanying drawings in which.

DETAILED DESCRIPTION

Figure 1:
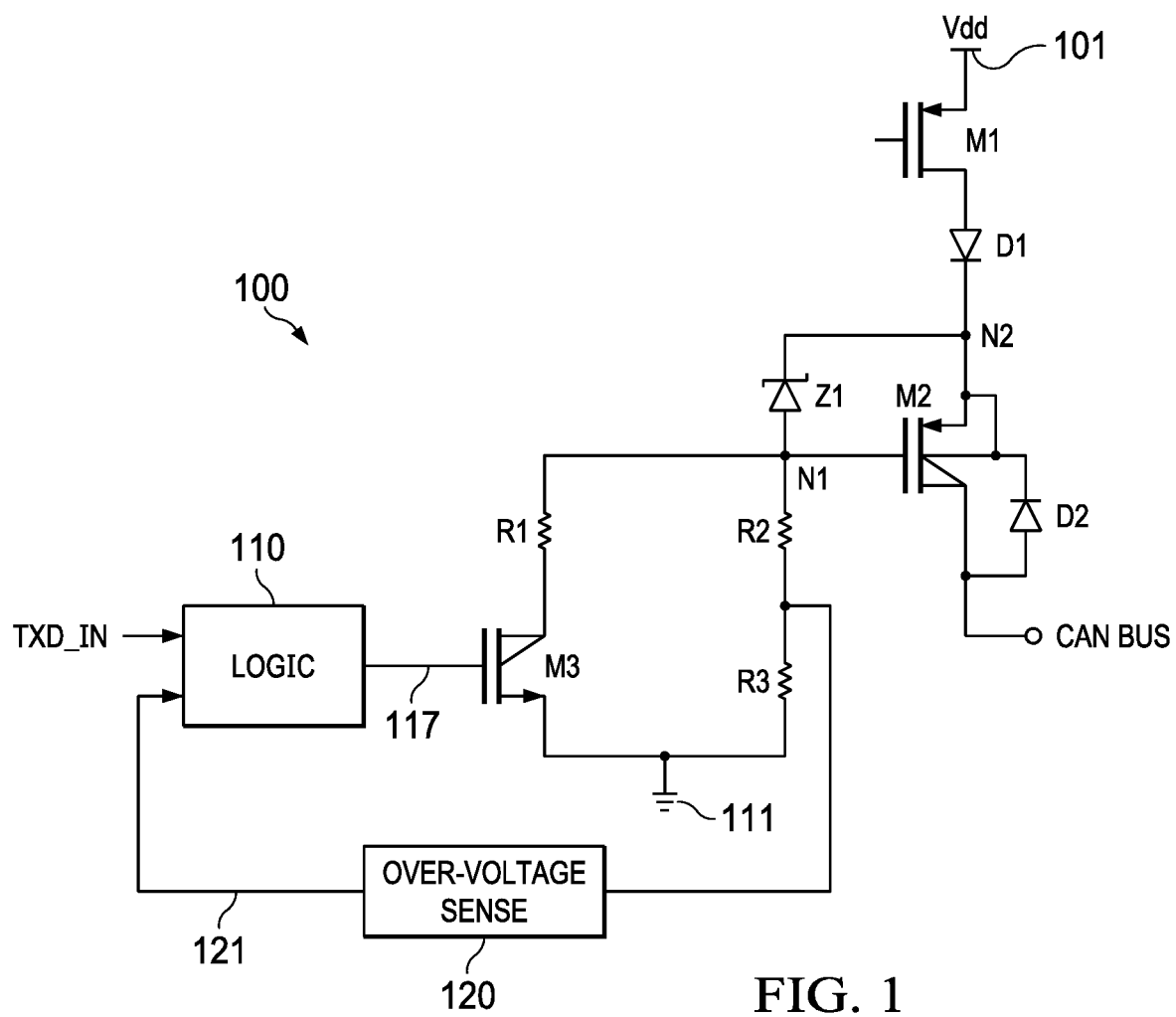
FIG. 1 illustrates an example circuit for a bus transceiver.

FIG. 1 shows an example transceiver 100 for driving a CAN BUS. The example transceiver 100 in FIG. 1 includes transistors M1, M2, and M3, resistors R1, R2, and R3, diode D1, a Zener diode Z1 (or other type of voltage clamp device), a logic circuit 110, and an over-voltage sense circuit 120. In this example, M1 and M2 comprise p-type metal oxide semiconductor field effect transistors (PMOS) and transistor M3 comprises an n-type metal oxide semiconductor field effect transistor (NMOS). The source of transistor M1 is connected to a supply voltage node 101 (VDD), and the drain of M1 is connected to the anode of diode D1. The cathode of diode D1 is connected to the source transistor M2 at node N2. The connection by the transceiver 100 to the CAN BUS is taken from the drain of transistor M2.

The Zener diode Z1 connects between the source and gate transistor M2. Diode D2 represents the body diode of transistor M2. The gate of transistor M2 is connected to an anode of Zener diode Z1 at node N1. Resistors R2 and R3 are connected in series between node N1 and the ground node 111. The node between resistors R2 and R3 is labeled N3. Resistors R2 and R3 form a voltage divider to produce a scaled version of the voltage on the gate of transistor M2 to the over-voltage sense circuit 120. Resistor R1 connects to node N1 and to the drain of transistor M3. The source of transistor M3 is connected to the ground node 111. Logic circuit 110 drives the gate transistor M3. The logic circuit 110 receives as inputs transmit data (TXD_IN) and an overvoltage signal 121 from the over-voltage sense circuit 120.

To actively drive the CAN BUS, transistor M2 is turned on. Because transistor M2 is a PMOS transistor in this example, PMOS transistor M2 is turned on by pulling its gate voltage low (more than a threshold voltage lower than its source voltage on node N2). The resistance of resistor R1 is relatively low (e.g., 1000 ohms) to provide sufficient strength to pull the gate voltage of transistor M2 sufficiently low to turn on transistor M2. To drive the CAN BUS, the logic circuit 110 turns on transistor M3, thereby pulling the gate voltage of transistor N2 low.

It is possible that the CAN BUS will experience a high-voltage glitch. For example, a voltage of 60 V could be temporarily imposed on the CAN BUS. Through the body diode D2 of transistor M2, a high voltage (the glitch voltage on the CAN BUS less the diode drop across the body diode D2) may be imposed on node N2, which is the source of transistor M2. Transistor M2 is a drain-extended high voltage transistor in this example. As such, transistor M2 can withstand a relatively high voltage between its drain and source terminals. However, the upper limit on the voltage that transistor M2 can withstand between its gate and source terminals (Vgs) is much lower, for example, 5 V. The Zener diode Z1 thus functions as a clamp to prevent the gate-to-source voltage (Vds) of transistor M2 from becoming so high as to damage transistor M2. When a high-voltage glitch on the CAN BUS is imposed on the source of transistor M2, the Zener diode Z1 clamps the voltage on the gate of transistor M2 at node N1 to a level that is the breakdown voltage of the Zener diode (for example, 5 V).

At this point, with a high-voltage glitch from the CAN BUS infecting node N2, a contention exists as to what the voltage on node N1 will be. The Zener diode Z1 attempts to clamp the voltage on N1 at its breakdown voltage (e.g., 5V) below the relatively high glitch voltage on the source of transistor M2, while on the other hand transistor M3 may still be on due to the control signal 117 from logic circuit 110 thereby causing the combination of transistor M3 and resistor R1 trying to pull the gate of transistor M2 low. As the voltage on node N1 increases due to Zener diode Z1, the voltage across resistor R1 increases. As noted above, the resistance of resistor R1 may be relatively low. Because the resistance of resistor R1 is relatively low, a large amount of current can flow through resistor R1. Because resistor R1 may have to tolerate a large current magnitude, the width of transistor R1 may be large, and resistor R1 may represent a large amount of space comprising transceiver 100. The high current level through resistor R1 and transistor M3 may damage transistor M3. To protect transistor M3, the overvoltage sense circuit 120 asserts an overvoltage signal 121 to logic circuit 110 responsive to the voltage on node N3 exceeding a threshold.

Resistors R2 and R3 are connected between the gate of transistor M2 and ground are useful to provide protection for transistor M3. However, the series connection of resistors R2 and R3 between the gate of transistor M2 and ground also functions to pull the gate of transistor M2 low even when logic circuit 110 turns off transistor M3 to transition the transceiver 100 into a recessive state (off). During the recessive state, transistor M3 is off but the voltage on node N2 is approximately one-half of VDD. In an example in which VDD is 5 V, during the recessive state of the transceiver 100, the voltage on node N2 is 2.5 V. Due to resistors R2 and R3 pulling the gate of transistor M2 low, transistor M2 remains on even during the recessive state. The gate-to-drain capacitance of transistor M2 is relatively high while transistor M2 is on. Thus, during the recessive state, transistor M2 is on and the transceiver 100 imposes a relatively high capacitance on the CAN BUS. As there will likely be multiple transceivers 100 connected to the common CAN BUS, multiple transceivers 100 may be in the recessive state thereby imposing a relatively high collective capacitance on the CAN BUS. The collectively high capacitance on the CAN BUS due to multiple transceivers being in the recessive state unfortunately causes the transceiver 100 that attempts to actively drive the CAN BUS to change the voltage on the CAN BUS relatively slowly, thereby slowing down the speed of the bus. It is thus desirable to limit the capacitance imposed by a transceiver on the CAN BUS to a smaller value so as not to capacitively load the CAN BUS while transceivers are in the recessive state. For example, it would be beneficial if transistor M2 were to be off while the transceiver was in the recessive state so as not to provide a capacitive load on the bus.

Figure 2:
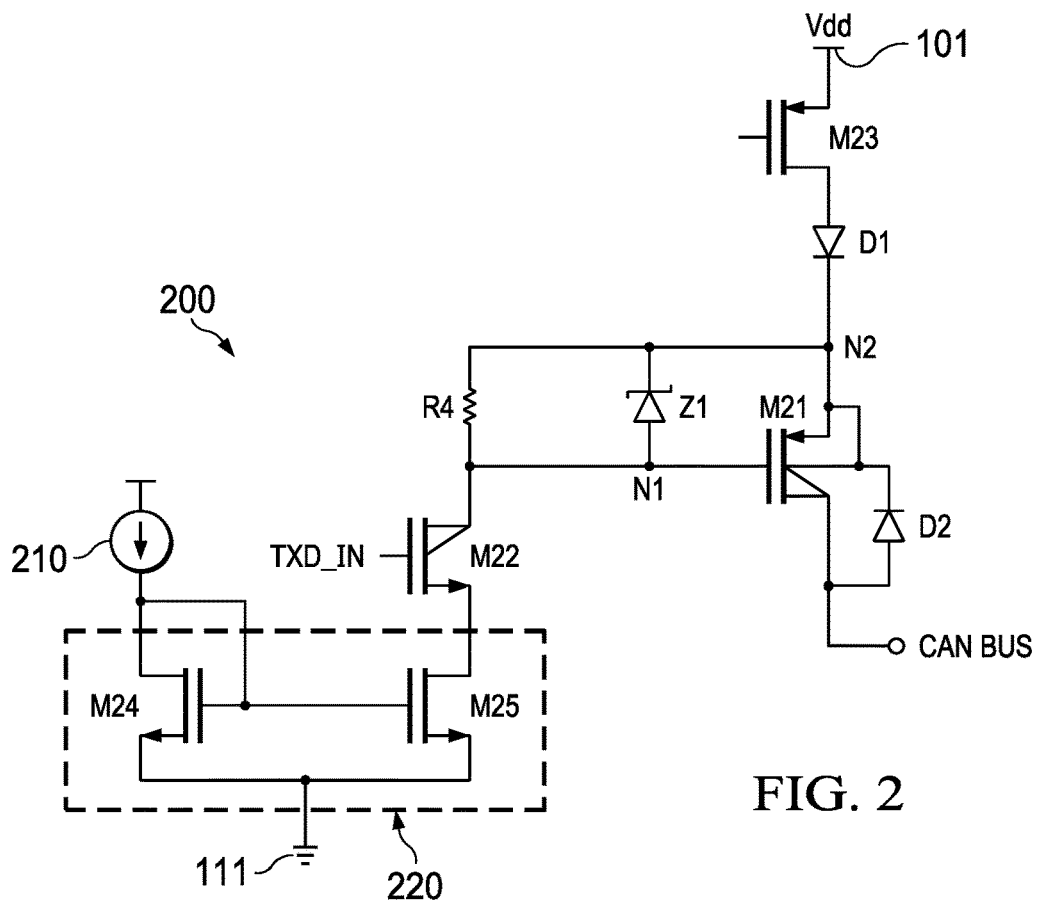
FIG. 2 illustrates another example circuit for a bus transceiver for driving a signal line of a bus.

FIG. 2 shows another example of a CAN BUS transceiver 200. Transceiver 200 in FIG. 2 includes transistors M21, M22, and M23, current source device 210, current mirror 220, Zener diode Z1 (or other type of voltage clamp device), and diode D1. Transistors M21 and M23 comprise PMOS transistors, and transistor M2 comprises an NMOS transistor. The source of transistor M23 is connected to the power supply node 101 (VDD), and the drain of transistor M23 is connected to the anode of diode D1. The cathode of diode D1 is connected to the source of transistor M21 at node N2 and to Zener diode Z1 and resistor R4 as shown. The drain of transistor M21 is connected to the CAN BUS. The body diode of transistor M21 is shown as diode D2 in FIG. 2. Resistor R4 and Zener diode Z1 connect between the source of transistor M21 at node N2 and the gate of transistor M22 at node N1. The drain of transistor M23 also connects to node N1.

Current mirror 220 comprises NMOS transistors M24 and M25. The gates of transistors M24 and M25 are connected together, as well as are their sources. The sources of transistors M24 and M25 are also connected to the ground node 111. The gate of transistor M24 is connected to its drain and to current source device 210. The source of transistor M22 is connected to the drain of transistor M25. The transmit input data (TXD_IN) is used to drive the gate of transistor M22 as shown.

The current source device 210 provides a relatively small current through transistor M24. In one example, the current from the current source device 210 is in the range of 0.1 mA to 4 mA. In one specific example, the current is 4 mA. The transistors M24 and M25 are sized to be the same (the ratio of their channel width to channel length is the same). As such, the current mirror ratio is 1 to 1, but can be other than 1:1 in other implementations. In one example, the current mirror ratio is implemented to cause the current through transistor M25 to be greater than or equal to 4 mA to meet external bus noise immunity requirements for the size of transistor M21. With a 1:1 current mirror ratio, the level of current from current source device 210 that flows through transistor M24 to ground is also generated in the signal path from node N2 through resistor R4 and transistors M22 and M25 to ground.

When the transceiver 200 is to drive the CAN BUS, the input transmit data turns on transistor M22. Turning on transistor M22 pulls the gate voltage of transistor M21 (node N1) to ground through transistors M22 and M25. As such transistor M21 turns on thereby driving the CAN BUS. When the input transmit data is low, transistor M22 is turned off and no current can flow through resistor R4 and transistors M22 and M25 to ground. In this recessive state, therefore, there is no circuit component actively pulling the gate voltage of transistor M21 low and thus the gate voltage of transistor M21 floats with the voltage on the source of transistor M21. As such, transistor M21 is off in the recessive state and provides much less capacitive loading on the CAN BUS than was the case for the transceiver 100 of FIG. 1. Resistor R4 is usable to discharge the parasitic gate-to-source capacitance of transistor M21.

If a high-voltage glitch occurs on the CAN BUS, a correspondingly high voltage will be imposed on the source of transistor M21 at node N2 due to the body diode D2 of transistor M1. Zener diode Z1 functions at this point to clamp the gate to source voltage of transistor M21 thereby protecting transistor M21 from damage to its gate oxide layer. A high-voltage glitch on the CAN BUS may infect node N1 (less the breakdown voltage of the Zener diode Z1), and thus a relatively high voltage will be present on the drain of transistor M22. Because current source 210 provides relatively little current (e.g., 4 mA) the current mirror 220 also causes relatively little current to flow through the circuit branch comprising resistor R4 and transistors M22 and M25 to ground even when the input transmit data is actively turning on transistor M22. This relatively low level of current through resistor R4 is insufficient to pull the gate of transistor M21 to a low voltage. Transistor M21 stays on this case because its Vgs is clamped to a safe level by Zener diode Z1.

Because of the relatively low current level caused by current source device 210 and current mirror 220, the transceiver 200 of FIG. 2 does not require an over-voltage sense circuit as was the case for the transceiver 100 of FIG. 1, nor does transceiver 200 require the voltage divider comprising series-connected resistors R2 and R3 as in the transceiver 100 of FIG. 1. Also, resistor R4 need not be capable of handling a large current level, and thus resistor R4 need not be nearly as large as resistor R1 in FIG. 1. The current through resistor R4 is limited to the clamping voltage implemented by Zener diode Z1 divided by the resistance of resistor R4. The rest of the current flows through the Zener diode Z1.

In one example, the CAN BUS is a differential bus comprising a signal pair. The transceivers 100 and 200 of FIGS. 1 and 2 drive one of the signals of the signal pair. A similarly configured transceiver circuit is operative to the drive the other signal of the signal pair comprising the CAN BUS.

Figure 3:
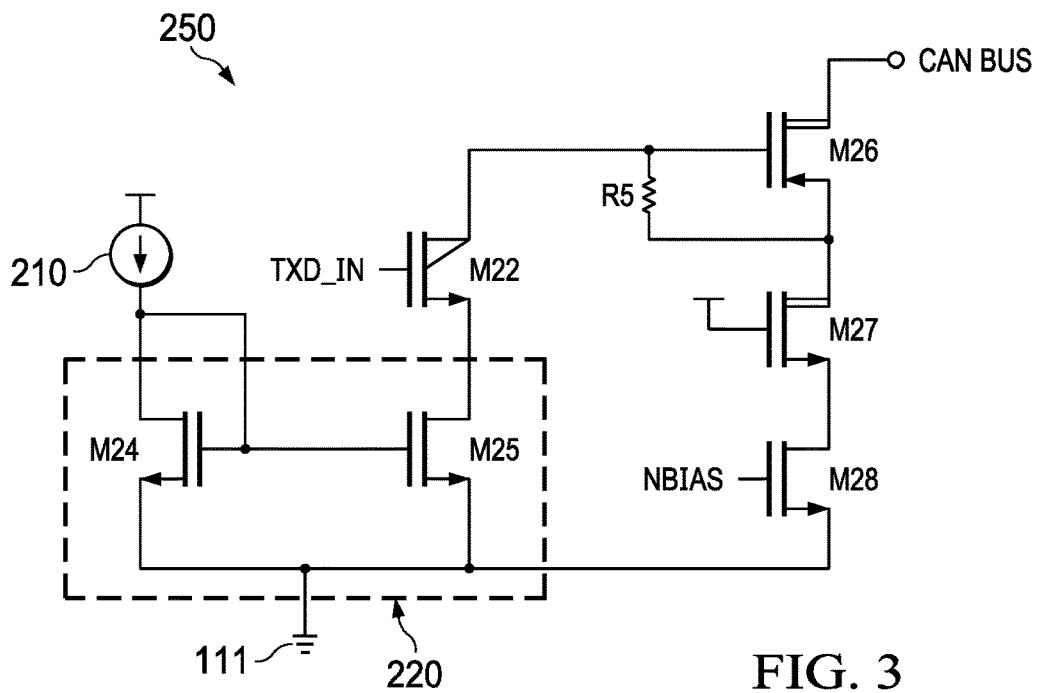
FIG. 3 shows an example circuit of the bus transceiver for driving another signal line of the bus.

The CAN BUS is a differential bus. The circuit of FIG. 2 shows the circuit for driving one signal line (e.g., the high side) of the differential bus. FIG. 3 shows the complementary circuit 250 for driving the other signal line (e.g., the low side) of the bus. Resistor R5 connects between the gate and source of PMOS transistor M26, and the drain of transistor M26 is connected to the CAN BUS (e.g., the low side). Transistors M27 and M28 connected between the source of transistor M26 and ground.

Figure 4:
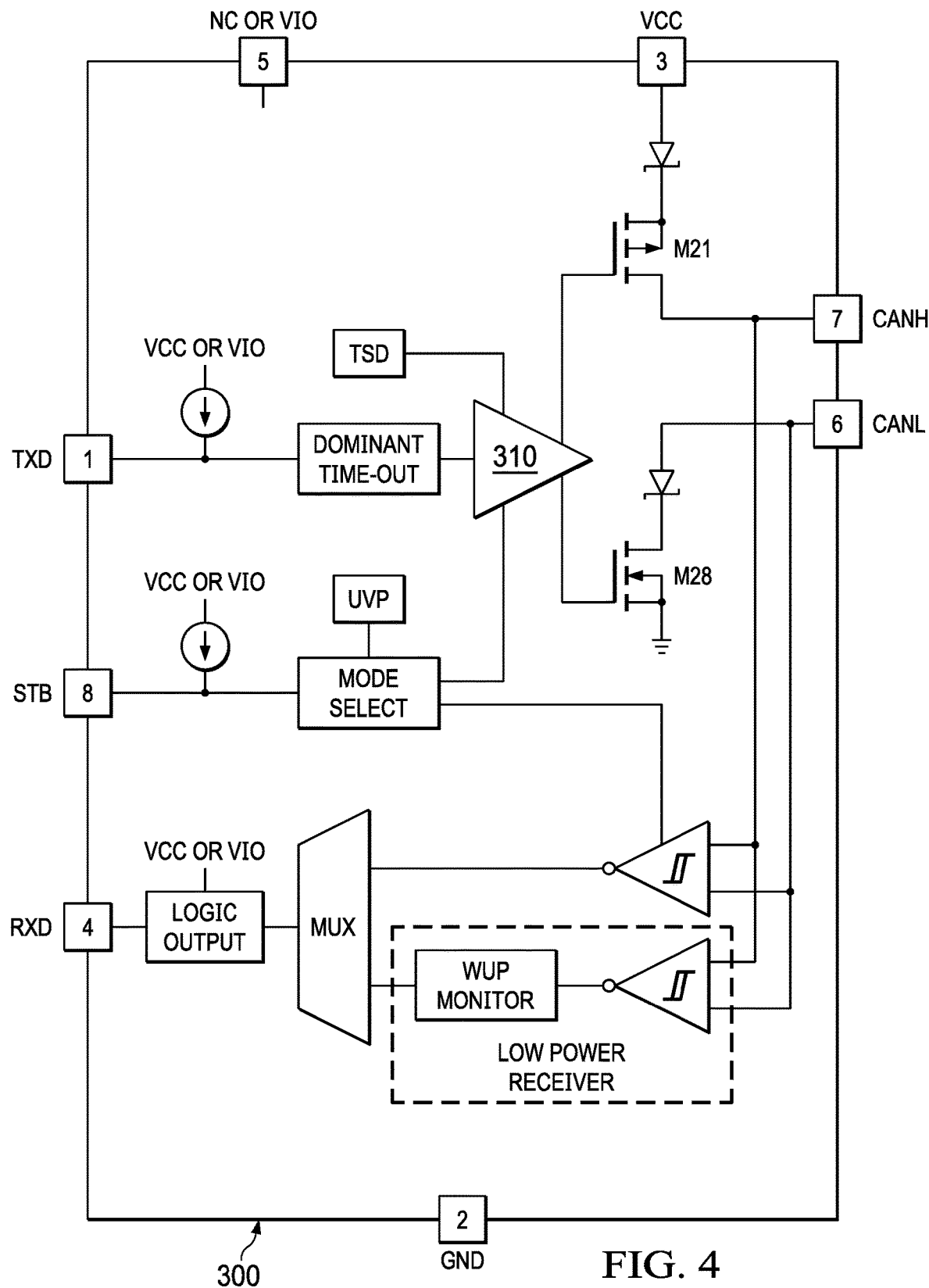
FIG. 4 is a block diagram of a bus transceiver integrated circuit (IC).

FIG. 4 shows an example of a CAN BUS transceiver integrated circuit (IC) 300. The IC 300 includes a pre-driver 310 and high and low side transistors M21 and M28 to drive the CAN BUS differential signals CANH and CANL. The transistor M21 is shown in FIG. 2, and the remaining components in FIG. 2 are part of the pre-driver 310. Transistor M28 is used to drive the CANL BUS signal and its drive circuitry is also part of the pre-driver 310.

In this description, the term "couple" or "couples" means either an indirect or direct wired or wireless connection. Thus, if a first device couples to a second device, that connection may be through a direct connection or through an indirect connection via other devices and connections. Modifications are possible in the described embodiments, and other embodiments are possible, within the scope of the claims.

What is claimed is:

1. A bus transceiver circuit, comprising:
   a current source device;
   a current mirror coupled directly to the current source device and coupled directly to ground;
   a first p-type metal-oxide semiconductor (PMOS) transistor having a gate, source and drain;
   an n-type metal-oxide semiconductor (NMOS) transistor having a gate, source and drain, the drain of the NMOS transistor directly coupled to the gate of the first PMOS transistor, and the source of the NMOS transistor directly coupled to the current mirror;
   a second PMOS transistor having a gate, source and drain wherein the source of the second PMOS transistor is directly coupled to a supply voltage and the drain of the second PMOS transistor is coupled to the source of the first PMOS transistor; and
   a resistor having a first terminal and a second terminal wherein the first terminal of the resistor is directly coupled to the source of the first PMOS transistor, and the second terminal of the resistor is directly coupled to the drain of the NMOS transistor.

2. The bus transceiver circuit of claim 1, further comprising a Zener diode coupled between the source of the first PMOS transistor and the drain of the NMOS transistor.

3. The bus transceiver circuit of claim 1, wherein the drain of the first PMOS transistor is adapted to be coupled to a bus.

4. The bus transceiver circuit of claim 1, wherein the gate of the NMOS transistor is adapted to receive a transmit signal.

5. The bus transceiver circuit of claim 1, further comprising:
   a Zener diode coupled between the source of the first PMOS transistor and the drain of the NMOS transistor; and
   a first diode coupled between the source of the first PMOS transistor and the drain of the second PMOS transistor.

6. The bus transceiver circuit of claim 1, wherein, while in a recessive state, the first PMOS transistor is configured to be off.

7. The bus transceiver circuit of claim 1, wherein, responsive to the NMOS transistor being off, a voltage on the gate of the first PMOS transistor is configured to float with respect to a voltage on the source of the first PMOS transistor.

8. The bus transceiver circuit of claim 1, wherein the current source device is configured to provide a current to the current mirror in the range of 0.1 mA to 4 mA.

9. A bus transceiver circuit, comprising:
   a current mirror coupled directly to ground;
   a first p-type metal-oxide semiconductor (PMOS) transistor having a gate, source and drain;
   an n-type metal-oxide semiconductor (NMOS) transistor having a gate, source and drain, the drain of the NMOS transistor directly coupled to the gate of the first PMOS transistor, and the source of the NMOS transistor directly coupled to the current mirror;
   a second PMOS transistor having a gate, source and drain wherein the source of the second PMOS transistor is directly coupled to a supply voltage and the drain of the second PMOS transistor is coupled to the source of the first PMOS transistor;
   a resistor having a first terminal and a second terminal wherein the first terminal of the resistor is directly coupled to the source of the first PMOS transistor, and the second terminal of the resistor is directly coupled to the drain of the NMOS transistor; and
   a Zener diode coupled between the source of the first PMOS transistor and the drain of the NMOS transistor.

10. The bus transceiver circuit of claim 9, further comprising a current source device coupled to the current mirror.

11. The bus transceiver circuit of claim 10, wherein the current source device is configured to generate a current in a range of 0.1 mA to 4 mA.

12. The bus transceiver circuit of claim 9, wherein the drain of the first PMOS transistor is adapted to be coupled to a bus.

13. The bus transceiver circuit of claim 9, wherein the gate of the NMOS transistor is adapted to receive a transmit signal.

14. The bus transceiver circuit of claim 9, further comprising a first diode coupled between the source of the first PMOS transistor and the drain of the second PMOS transistor.

15. The bus transceiver circuit of claim 9, wherein, while in a recessive state, the first PMOS transistor is configured to be off.

16. The bus transceiver circuit of claim 9, wherein, responsive to the NMOS transistor being off, a voltage on the gate of the first PMOS transistor is configured to float with respect to a voltage on the source of the first PMOS transistor.

17. A bus transceiver circuit, comprising:
   a current source device;
   a current mirror directly coupled to the current source device and directly coupled to ground;
   a first p-type metal-oxide semiconductor (PMOS) transistor having a gate, source and drain;
   an n-type metal-oxide semiconductor (NMOS) transistor having a gate, source and drain, the drain of the NMOS transistor directly coupled to the gate of the first PMOS transistor, and the source of the NMOS transistor directly coupled to the current mirror;
   a second PMOS transistor having a gate, source and drain wherein the source of the second PMOS transistor is directly coupled to a supply voltage and the drain of the second PMOS transistor is coupled to the source of the first PMOS transistor;
   a resistor having a first terminal and a second terminal wherein the first terminal of the resistor is directly coupled to the source of the first PMOS transistor, and the second terminal of the resistor is directly coupled to the drain of the NMOS transistor; and
   a voltage clamp device coupled between the source of the first PMOS transistor and the drain of the NMOS transistor;
   wherein the drain of the first PMOS transistor is adapted to be coupled to a bus;
   wherein the gate of the NMOS transistor is adapted to receive a transmit signal; and
   wherein, while in a recessive state, the first PMOS transistor is configured to be off.

18. The bus transceiver of claim 17, wherein the voltage clamp device comprises a Zener diode.

19. The bus transceiver of claim 17, wherein the PMOS and NMOS transistors comprise drain-extended transistors.

20. The bus transceiver of claim 17, wherein the bus is a controller area network (CAN) bus.

\* \* \* \* \*